(12) United States Patent
Bawiskar et al.

(10) Patent No.: US 12,070,876 B2
(45) Date of Patent: Aug. 27, 2024

(54) APPARATUS AND METHOD FOR GRANULATING LOW VISCOSITY MATERIALS

(71) Applicant: Dow Global Technologies LLC, Midland, MI (US)

(72) Inventors: Santosh S. Bawiskar, Lake Jackson, TX (US); Michael J. Zogg, Jr., Lake Jackson, TX (US); Guang Ming Li, Lake Jackson, TX (US); Yi Jin, Lake Jackson, TX (US); Lonnie Schilhab, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 561 days.

(21) Appl. No.: 17/272,338

(22) PCT Filed: Aug. 27, 2019

(86) PCT No.: PCT/US2019/048344
§ 371 (c)(1),
(2) Date: Feb. 28, 2021

(87) PCT Pub. No.: WO2020/046936
PCT Pub. Date: Mar. 5, 2020

(65) Prior Publication Data
US 2021/0316481 A1    Oct. 14, 2021

Related U.S. Application Data

(60) Provisional application No. 62/724,835, filed on Aug. 30, 2018.

(51) Int. Cl.
*B29B 13/04* (2006.01)
*B29B 9/10* (2006.01)
(Continued)

(52) U.S. Cl.
CPC ............ *B29B 13/04* (2013.01); *B29B 9/10* (2013.01); *C08F 210/16* (2013.01); *C08J 3/12* (2013.01);
(Continued)

(58) Field of Classification Search
CPC .................................. B01J 2/26; B29B 9/10
See application file for complete search history.

(56) References Cited

U.S. PATENT DOCUMENTS 2,790,201 A    4/1957  Se
3,265,779 A    8/1966  Gobla et al.
(Continued)

FOREIGN PATENT DOCUMENTS

CN    203437098    2/2014
DE    102007007310    8/2008
(Continued)

OTHER PUBLICATIONS

PCT/US2019/048344, International Preliminary Report on Patentability with a mailing date of Mar. 2, 2021.
(Continued)

*Primary Examiner* — Seyed Masoud Malekzadeh
*Assistant Examiner* — Xinwen Ye

(57) ABSTRACT

An apparatus to batch or continuously form solid polymer particles, the apparatus comprising the following components: A) at least one pastillation unit comprising a pastillation head, said unit used to form discrete molten polymer particles from a polymer melt; B) a moving belt to receive and transfer the discrete molten polymer particles from the pastillation head; C) a means to transfer water onto the moving belt, such that the water comes into contact with the discrete molten polymer particles on the moving belt to form the solid polymer particles; and wherein the water of component C is sprayed onto the discrete molten polymer
(Continued)

particles, such that the ratio of "the rate of water spray" to "the discharge rate" is ≥3.0; and wherein the belt residence time is ≤50 seconds.

11 Claims, 1 Drawing Sheet

(51) Int. Cl.
  *B29K 23/00* (2006.01)
  *C08F 210/16* (2006.01)
  *C08J 3/12* (2006.01)
(52) U.S. Cl.
  CPC ...... *B29K 2023/06* (2013.01); *B29K 2023/12* (2013.01); *B29K 2995/0063* (2013.01); *B29K 2995/0088* (2013.01)

(56) References Cited

U.S. PATENT DOCUMENTS

| | | | |
|---|---|---|---|
| 4,610,615 A | 9/1986 | Froeschke | |
| 5,198,233 A | 3/1993 | Kaiser | |
| 5,340,509 A | 8/1994 | Chang et al. | |
| 5,510,454 A | 4/1996 | Stouffer et al. | |
| 5,633,018 A | 5/1997 | Stouffer et al. | |
| 5,744,074 A | 4/1998 | Stouffer et al. | |
| 5,830,982 A | 11/1998 | Stouffer et al. | |
| 7,267,878 B2 | 9/2007 | Primke et al. | |
| 8,203,008 B2 | 6/2012 | De Vos | |
| 2007/0131381 A1 | 6/2007 | Schermutzki et al. | |
| 2009/0121372 A1 | 5/2009 | Campbell et al. | |
| 2011/0185631 A1 | 8/2011 | Subramanian et al. | |
| 2011/0306717 A1 | 12/2011 | Eswaran et al. | |
| 2020/0131282 A1 | 4/2020 | Zogg, Jr. et al. | |

FOREIGN PATENT DOCUMENTS

| | | |
|---|---|---|
| DE | 102014224736 | 6/2016 |
| EP | 2353708 | 8/2011 |
| WO | 1997025364 | 7/1997 |
| WO | 2001047677 | 7/2001 |
| WO | 2015191066 | 12/2015 |
| WO | 2019014005 | 1/2019 |

OTHER PUBLICATIONS

PCT/US2019/048344, International Search Report and Written Opinion with a mailing date of Nov. 11, 2019.
Office Action from corresponding Chinese Application 201980064133.6 dated Feb. 9, 2023.

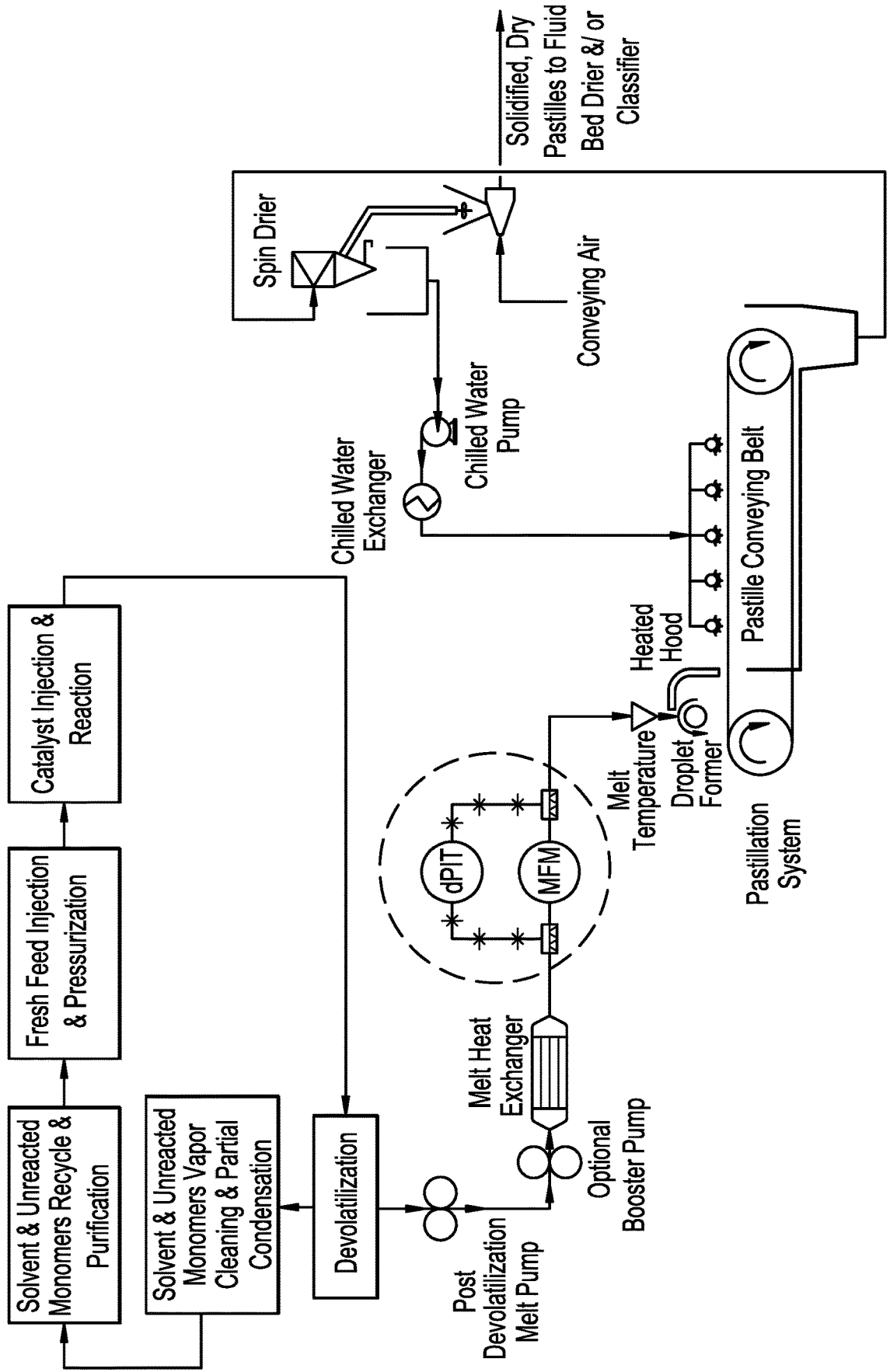

APPARATUS AND METHOD FOR GRANULATING LOW VISCOSITY MATERIALS

CROSS REFERENCE TO RELATED APPLICATIONS

The present application claims benefit of priority to U.S. Application No. 62/724,835, filed on Aug. 30, 2018, which is incorporated herein by reference in its entirety.

BACKGROUND

Low viscosity polymers have low melt strength and, as a consequence, are difficult to convert from a melt to a solid particle via underwater pelletization. There is a need for an apparatus and process to efficiently solidify low viscosity, low melt strength polymers. Incumbent technologies, such as pastillation and waterslide strand pelletization, require large amounts of space for equipment and/or have low productivity rates.

Underwater pelletization excels in efficiency (cooling rate, space requirements); however, with materials of low melt strength and low viscosity, it becomes difficult to cut pellets without blade wrap-up. Further, 'die freeze-off' frequently occurs, when the melt is cooled excessively, to gain on melt strength, and plugs the die hole. Thus, underwater pelletization of low viscosity, low melt strength materials is challenging, and even more so on large scale equipment due to poor control over heat transfer.

Pastillation is an alternate solidification method that is well suited for low viscosity, low melt strength materials, such as paraffin waxes. Although this process works well, it is inefficient from a productivity (throughput) standpoint. This is mainly because the pastilles formed are cooled via conductive cooling on a belt, which is sprayed with cold water from underneath. The heat transfer and cooling rate are very slow compared to underwater pelletization, where the pellets are directly quenched in cold water. Another drawback of the pastillation process is the large amount of space required compared to underwater pelletization which makes it difficult to adapt this technology to existing polymerization trains.

Another process used to solidify low viscosity, low melt strength materials is waterslide strand pelletization. In this process, strands, formed on an inclined water trough, are conveyed using a stream of water into a cutting chamber. Additional water sprays create turbulence, and help cool the strands. In this case, the cutting is done after the strands are solidified (or crystallized). The waterslide strand pelletizer also suffers from the drawback of efficiency, from both a throughput and space standpoint, and this process is also more difficult to automate. Moreover, cutting a hardened strand with a cutter is less desirable, compared to cutting material in its molten (i.e., liquid) form.

Polymerization and isolation processes are also disclosed in the following references: US 2011/0185631, US 2011/0306717, US 2009/0121372, U.S. Pat. No. 5,340,509, WO 2001047677, U.S. Pat. Nos. 5,830,982, 5,744,074, 8,203,008, EP 1397455 A1, DE 10122437 A1 (Abstract), U.S. Pat. Nos. 5,510,454, 5,633,018, WO 1997025364, WO 2015191066, U.S. Pat. Nos. 2,790,201, 4,610,615, EP 0363975 A1, and U.S. Prov. Appl. 62/532,487, filed on Jul. 14, 2017.

As discussed, there is a need for an isolation apparatus and process that can operates at higher throughput, while avoiding the need for a large footprint to accommodate the equipment, and which can be used to solidify low viscosity, low melt strength polymers at a high rate. These needs have been met by the following invention.

SUMMARY OF THE INVENTION

An apparatus to batch or continuously form solid polymer particles, the apparatus comprising the following components:
  A) at least one pastillation unit comprising a pastillation head (i.e., droplet former), said unit used to form discrete molten polymer particles from a polymer melt;
  B) a moving belt to receive and transfer the discrete molten polymer particles from the pastillation head;
  C) a means to transfer water onto the moving belt, such that the water comes into contact with the discrete molten polymer particles on the moving belt to form the solid polymer particles; and
wherein the water of component C is sprayed onto the discrete molten polymer particles, such that the ratio of "the rate of water spray" to "the discharge rate" is ≥3.0; and wherein the belt residence time is ≤50 seconds.

BRIEF DESCRIPTION OF THE DRAWINGS

FIG. 1 is a schematic of the equipment configuration that can be used to granulate low viscosity materials.

DETAILED DESCRIPTION OF THE INVENTION

An apparatus and process have been developed for the batch or continuous solidification of low viscosity, low melt strength polymers, and which provides better productivity (due to enhanced cooling), low space requirements, and eliminates drawbacks of the incumbent technologies mentioned above. The apparatus and processes described herein are not limited to only polymers, but could also be applicable to a variety of other materials like waxes and bitumen.

An apparatus to batch or continuously form solid polymer particles, the apparatus comprising the following components:
  A) at least one pastillation unit comprising a pastillation head (i.e., droplet former), said unit used to form discrete molten polymer particles from a polymer melt;
  B) a moving belt to receive and transfer the discrete molten polymer particles from the pastillation head;
  C) a means to transfer water onto the moving belt, such that the water comes into contact with the discrete molten polymer particles on the moving belt to form the solid polymer particles; and
wherein the water of component C is sprayed onto the discrete molten polymer particles, such that the ratio of "the rate of water spray" to "the discharge rate" is ≥3.0; and wherein the belt residence time is ≤50 seconds.

An inventive apparatus may comprise a combination of two or more embodiments as described herein.

In one embodiment, or a combination of embodiments described herein, the ratio of "the rate of water spray" to "the discharge rate" is ≥4.0. In one embodiment, or a combination of embodiments described herein, the ratio of "the rate of water spray" to the "discharge rate" is ≥4.0, further ≥5.0, further ≥6.0, further ≥7.0, further ≥8.0, further ≥9.0, further ≥10.0.

In one embodiment, or a combination of embodiments described herein, the specific capacity of the pastillation unit is ≥12 lbs/hr/ft$^2$, further ≥15 lbs/hr/ft$^2$, further ≥22 lbs/hr/ft$^2$, further ≥29 lbs/hr/ft$^2$ and further ≥36 lbs/hr/ft$^2$.

In one embodiment, or a combination of embodiments described herein, the specific capacity of the pastillation unit is ≤70 lbs/hr/ft$^2$, further ≤60 lbs/hr/ft2 and further ≤50 lbs/hr/ft2.

In one embodiment, or a combination of embodiments described herein, the belt residence time is ≤40 seconds, further ≤30 seconds, further ≤20 seconds, further ≤10 seconds, and further ≤5 seconds.

In one embodiment, or a combination of embodiments described herein, the temperature of the polymer melt at the pastillation head (i.e., droplet former) is from 120° C. to 275° C., or from 125° C. to 250° C., or from 130° C. to 230° C.

In one embodiment, or a combination of embodiments described herein, the water of component C is sprayed onto the discrete molten polymer particles (for example, molten pastilles) using a nozzle that provides a continuous stream of water or water droplets. In a further embodiment, the nozzle design is such that the water stream or droplets spread across the entire width of the belt. Preferably, multiple nozzles are placed along the length of the belt to enhance cooling of the discrete molten polymer particles.

In one embodiment, or a combination of embodiments described herein, a heat exchanger is located upstream from the pastillation unit.

In one embodiment, or a combination of embodiments described herein, two or more pastillation units are placed in parallel.

In one embodiment, the inventive apparatus may be combined with a centrifugal drier and/or a fluid bed drier and/or a cooler classifier to enhance separation of cooling water from the pastilles and drying them. Suitable centrifugal driers are manufactured for e.g. by Gala Corporation or Carter Day. Suitable fluid bed driers and classifiers are manufactured for e.g. by Witte Corporation. Such devices are used to simultaneously dry particles while separating them based on size or to simply separate the particles based on size.

In one embodiment, or a combination of embodiments described herein, the polymer melt comprises an olefin-based polymer.

In one embodiment, or a combination of embodiments described herein, the polymer melt comprises ≥95 wt %, or ≥98 wt %, or 99 wt % of the olefin-based polymer, based on the weight of the polymer melt.

In one embodiment, or a combination of embodiments described herein, the olefin-based polymer has a melt viscosity (177° C.) from 50 cP to 10000 cP, or from 100 cP to 8000 cP, or from 200 cP to 6000 cP.

In one embodiment, or a combination of embodiments described herein, the olefin-based polymer has a melt viscosity (177° C.) from 50 cP to 1000 cP, or from 100 cP to 1000 cP, or from 200 cP to 1000 cP or from 500 cP to 1000 cP.

In one embodiment, or a combination of embodiments described herein, the olefin based polymer has a number average molecular weight from 500 g/mole to 50000 g/mole, or from 500 g/mole to 20000 g/mole, or from 500 g/mole to 10000 g/mole.

In one embodiment, or a combination of embodiments described herein, the olefin based polymer has a density from 0.860 g/cc to 0.960 g/cc, or from 0.860 g/cc to 0.940 g/cc, or from 0.860 g/cc to 0.920 g/cc, or from 0.860 g/cc to 0.900 g/cc, of from 0.865 g/cc to 0.890 g/cc (1 cc=1 cm$^3$).

In one embodiment, or a combination of embodiments described herein, the olefin-based polymer has a molecular weight distribution (MWD) from 2.0 to 4.0, or from 2.2 to 3.8, or from 2.4 to 3.6.

In one embodiment, or a combination of embodiments described herein, the olefin-based polymer is a propylene-based polymer.

In one embodiment, or a combination of embodiments described herein, the propylene-based polymer is a propylene-based interpolymer, and further a propylene-based copolymer.

In one embodiment, or a combination of embodiments described herein, the propylene-based polymer is a propylene/alpha-olefin interpolymer, and further a propylene/alpha-olefin copolymer, and further a propylene/C4-C8 alpha-olefin copolymer.

In one embodiment, or a combination of embodiments described herein, the propylene-based polymer is a propylene/ethylene interpolymer, and further a propylene/ethylene copolymer.

In one embodiment, or a combination of embodiments described herein, the olefin-based polymer is an ethylene-based polymer.

In one embodiment, or a combination of embodiments described herein, the ethylene-based polymer is an ethylene-based interpolymer, and further an ethylene-based copolymer.

In one embodiment, or a combination of embodiments described herein, the ethylene-based polymer is an ethylene/alpha-olefin interpolymer, and further an ethylene/alpha-olefin copolymer, and further an ethylene/C3-C8 alpha-olefin copolymer.

In one embodiment, the present disclosure relates to a process to form solid polymer particles from a polymer melt, said process comprising pastillating the polymer melt using the apparatus of one or more embodiments described herein.

In one embodiment, or a combination of embodiments described herein, the process is a continuous process.

In one embodiment, or a combination of embodiments described herein, the solution polymerization takes place in one or more conventional reactors e.g. loop reactors, isothermal reactors, and/or stirred tank reactors in parallel, series, and/or any combinations thereof in continuous mode to produce olefin based polymers, e.g. ethylene polymers or propylene polymers.

In one embodiment, the polymerization temperature is in the range from 100 to 300° C.; for example, from 120 to 190° C., and at pressures in the range of from 300 to 1000 psig; for example, from 400 to 750 psig.

Multiple pastillation units may be fed, in parallel, from a single polymer production plant to match the pastillation rate to the polymer production rate. Multiple pastillators are necessary when the heat removal required for proper solidification of the pastilles for a given throughput exceeds the cooling capacity of a single pastillator.

An inventive process may comprise a combination of two or more embodiments as described herein.

Olefin-Based Polymers

In one embodiment, or a combination of embodiments described herein, the olefin-based polymer melt has a viscosity, at 177° C.≤30000 cP, or ≤20000 cP, or ≤10000 cP, or ≤5000 cP.

In one embodiment, or a combination of embodiments described herein, the olefin-based polymer has a melt viscosity (177° C.) from 500 to 10000 cP, or from 600 to 9500 cP, or from 700 to 9000 cP, or from 800 to 8500 cP, or from 900 to 8000 cP.

In one embodiment, or a combination of embodiments described herein, the olefin-based polymer has density from 0.855 to 0.900 g/cc, or from 0.860 to 0.895 g/cc, or from 0.865 to 0.890 g/cc, or from 0.870 to 0.885 g/cc.

In one embodiment, or a combination of embodiments described herein, the olefin-based polymer has a number average molecular weight (Mn) from 5000 to 50000 g/mole, or from 5000 to 30000 g/mole, or from 10000 to 25000 g/mole, or from 10000 to 22000 g/mol.

In one embodiment, or a combination of embodiments described herein, the olefin-based polymer has a molecular weight distribution (MWD) from 1.80 to 3.20, or from 1.90 to 3.15, or from 2.00 to 3.10, or from 2.10 to 3.05, or from 2.20 to 3.00.

In one embodiment, or a combination of embodiments described herein, the olefin-based polymer has a weight average molecular weight (Mw) from 1000 to 100000 g/mole, or from 5,000 to 50000 g/mole, or from 10,000 to 50000 g/mole, or from 30000 to 50000 g/mol.

In one embodiment, or a combination of embodiments described herein, the olefin-based polymer is a propylene-based polymer, and further a propylene-based interpolymer, and further a propylene-based copolymer.

In one embodiment, or a combination of embodiments described herein, the olefin-based polymer is a propylene/alpha-olefin interpolymer, and further a propylene/alpha-olefin copolymer. Suitable alpha-olefins include the C4-C8 alpha-olefins, In one embodiment, or a combination of embodiments described herein, the olefin-based polymer is a propylene/ethylene interpolymer, and further a propylene/ethylene copolymer.

In one embodiment, or a combination of embodiments described herein, the olefin-based polymer is an ethylene-based polymer, and further an ethylene-based interpolymer, and further an ethylene-based copolymer.

In one embodiment, or a combination of embodiments described herein, the olefin-based polymer is an ethylene/alpha-olefin interpolymer, and further an ethylene/alpha-olefin copolymer. Suitable alpha-olefins include the C3-C8 alpha-olefins.

Polymerizations

In one embodiment, olefin based polymers, e.g. propylene polymers or ethylene polymers may be prepared using a catalyst composition via a solution phase polymerization process in a single, loop reactor configuration. All raw materials (propylene, and optionally one or more alpha-olefin comonomers such as ethylene or 1-octene) and the process solvent (an isoparaffinic solvent, for example ISOPAR E®) are preferably purified with molecular sieves before introduction into the reaction environment. Hydrogen is supplied as a high purity grade and is not further purified. Fresh monomer feed (propylene) to the reactor is pressurized via a mechanical positive displacement pump to a pressure that is above the reaction pressure (e.g., 650 psig). The recycle feed (containing solvent and unreacted monomer, comonomer, and hydrogen) is pressurized via a mechanical positive displacement pump to a pressure that is above the reaction pressure. The fresh comonomer (ethylene) feed is pressurized, via mechanical compressor, to a pressure that is above the reactor pressure. The individual catalyst components can be manually batch diluted to specified component concentrations with purified solvent and pressurized via mechanical positive displacement pumps to a pressure that is above the reaction pressure. All reaction feed flows are measured with coriolis mass flow meters (MFM) and independently controlled with computer automated valve control systems.

Independent control of each of monomer, comonomer, hydrogen, recycle solvent, and catalyst component feeds is possible. The combined solvent, monomer, comonomer and hydrogen feed is temperature controlled to anywhere between 5° C. to 50° C. and typically 10° C. by passing the feed stream through a heat exchanger. After temperature conditioning the stream, the total feed is injected into the polymerization reactor. The catalyst components can be injected into the polymerization reactor through, multiple injectors that separately introduce the catalyst complex and cocatalysts into the reactor for insitu mixing, contacting, and activation. The catalyst complex feed is computer controlled to maintain the reactor monomer (propylene) concentration at a specified target (g propylene/liter of reaction liquor). The cocatalyst components are fed based on calculated specified molar ratios to the catalyst complex.

The contents of the reactor can be continuously circulated through heat exchangers that have a cold utility fluid flowing across the shell side to remove much of the heat of reaction and maintain a near isothermal reaction environment at a specified temperature; for example 155° C. Water is injected into the polymerization stream as it exits the reactor to terminate the reaction. The polymer solution then passes through a heat exchanger to heat the stream to a temperature in the range of 235-300° C. to prepare for devolatilization. From this heat exchanger, the pressure of the stream is reduced as it discharges from the automated reactor pressure valve and enters the first of a two stage devolatilization system where the polymer is removed from much of the solvent, hydrogen, and unreacted monomer and comonomer. The vaporized solvent and unreacted monomers are cooled and partially condensed prior to removing polar impurities such as water and reinjection into the reactor. The concentrated polymer solution is forwarded, via positive displacement pump, through a second heat exchanger where the stream is heated to a temperature in the range of 200° C.-275° C. The effluent from this heat exchanger discharges into a devolatilizer that operates under vacuum in the range of 5-50 mmHg-absolute. The vaporized solvent and unreacted monomers are cooled and partially condensed prior to removing polar impurities, such as water, and reinjection into the reactor. The nearly pure polymer melt (polymer concentration ≥99.8 wt %) is forwarded to the pastillation system via mechanical, positive displacement pump.

Preferably the devolatilized polymer melt is pumped through a heat exchanger that is used to manipulate the polymer viscosity to a value less than approximately 3000 cP at 177° C. as measured via ASTM D3236. For final polymer product viscosities less than or equal to approximately 3000 cP at 177° C., the polymer is cooled as it passes through the heat exchanger. For final polymer product viscosities greater than 3000 cP at 177° C., the polymer is heated as it passes through the heat exchanger. The polymer temperature typically less than 300° C., for example less than 275° C., or in the range of from 80 to 250° C.; thereby producing an ultra-low viscosity polymer melt. Subsequently, the heated, molten polymer (i.e., polymer melt) is fed to a pastillator to be converted from liquid to discrete molten polymer particles.

Molten polymer (i.e., polymer melt) is pumped to the droplet forming section of the pastillation unit. Typically technologies used to feed the droplet former include single screw extruders, twin screw extruders, and centrifugal pumps as well as positive displacement pumps including piston, progressive cavity, and the preferred technology, gear pumps. A single pump or, as shown in the process flow diagram, multiple pumps can be utilized to feed the polymer from the final flash vessel to the pastillator. Also, the polymer melt can be pumped directly to the pastillator or first through a heat exchanger utilized to control the polymer temperature entering the droplet former within the target range of 80 to 300° C. and most preferably 125 to 250° C.

Molten polymer (polymer melt) enters the pastillation unit through the feed bar section within the droplet former. The pump pushes molten polymer (polymer melt) through the feed bar and into a rotating shell containing holes. Molten polymer discharges through the holes in the shell and deposits onto a steel, conveying belt in the form of discrete molten polymer particles (i.e., discrete molten pastilles). A pastille has a hemispherical shape with the flat side in contact with the belt. The belt rotates in the opposite direction of the droplet former thus taking the discrete molten polymer particles (i.e., discrete molten pastilles) away from the rotating shell. Chilled water is sprayed onto the underside of the belt to conductively cool the discrete molten polymer particles (i.e., discrete molten pastilles) while they travel the length of the belt before discharging into a conveying system. With the apparatus of the present disclosure, chilled water is also sprayed from above and onto the top of the conveying belt to conductively cool the discrete molten polymer particles (i.e., discrete molten pastilles) while they travel the length of the belt before discharging into a conveying system. As the discrete molten polymer particles (i.e., discrete molten pastilles) travel the length of the belt, they are cooled to form solid polymer particles.

Definitions

Unless stated to the contrary, implicit from the context, or customary in the art, all parts and percents are based on weight, and all test methods are current as of the filing date of this application.

The term "polymer melt" or "molten polymer" as used herein, refers to polymer fluid being above its melting point.

The term "discrete molten polymer particles" and like terms as used herein refer to droplets of polymer melt that discharge from the pastillation head onto the moving belt.

The terms "moving belt," "conveying belt," and similar terms are interchangeable herein.

The phrase "a means to transfer water," as used herein, refers to a water pumping and circulation system that comprises of a suitable pump, piping, spray nozzles, and optionally a heat exchanger to maintain water temperature, and a drainage system that collects the water and transports the water to the pump.

The term "discharge rate" or "pastillation rate," or "feed rate" as used herein, for a given machine size (belt length and width), and cooling rate the pastillator, refers to the amount (weight) of polymer that can be converted to pastilles in a unit time. One or more pastillation units may be used in parallel to ensure that the polymerization rate and pastillation rate are matched. In one embodiment, or a combination of embodiments described herein, the term "discharge rate" and similar terms refer to the amount of polymer in pounds that can be converted to pastilles per hour.

The term "belt residence time," as used herein, refers to the time a polymer particle spends on the moving belt, from the location of the drop point from the pastillation head (i.e., droplet former) to the discharge location from the belt.

The term "devolatilizer," as used herein, refers to a mechanical device that is operated to allow volatile components (i.e., solvent, unreacted monomers, comonomers, and hydrogen) of a stream to vaporize and separate from less volatile components (i.e., polymer). A standard devolatilization unit is a pressure vessel that operates partially filled and at a lower pressure than the incoming stream (for example, a polymer solution) pressure thus allowing the low boiling components to vaporize.

The term "heat exchanger," as used herein, refers to a pressure vessel that processes two distinct streams, transferring energy between the streams without physically contacting the two. This device is designed to compactly provide the requisite surface area, along with manipulation and control of the utility fluid flow and inlet temperature, to properly transfer the heat energy to control the process fluid at target temperature. The shell and tube design is a common form of the technology used in the industry.

The term "pastillation unit," as used herein, refers to a mechanical device that is used to convert a liquid feed (i.e., molten polymer) to solid pastilles. The primary components of the apparatus include a droplet former, a heated hood, a conveying belt, and a chilled water spray. Polymer is ejected through the droplet former and onto the conveying belt in the form of molten pastilles. The droplet former and conveying belt rotate in the opposite direction. Cold water is sprayed on the underside of the conveying belt to conductively cool and solidify the molten pastilles as they move down the length of the belt.

The term "pastillation head" or "droplet former," as used herein, refers to a two component part comprising a stationary feed bar and a rotating outer shell that surrounds the feed bar, and which is used to create discrete droplets of molten polymer from the olefin-based polymer in melt form. Typically, the olefin-based polymer melt is pumped through a channel in the stationary feed bar, and the polymer melt is discharged through one or more orifices on the feed bar, into one or more channels through the rotating outer shell. The polymer melt is discharged through one or more holes on the shell, and-deposited onto a conveying belt. The rotation of the outer shell, typically a counterclockwise rotation, is in the opposite rotational direction to the conveying belt.

The term "heated hood," as used herein, refers to a heater (for example, an electric heater) that traverses the length of and is positioned in close proximity to the droplet former. The heated hood increases the air temperature around the droplet former to prevent cooling and the subsequent increase in viscosity/melt strength of the polymer as it is flowing through the holes on the rotating shell. This unit operation aims to reduce the tendency to form strings.

The term "solid polymer particles," as used herein, refers to particles of a variety of shapes (for example, granules, pastilles or pellets), and formed as a polymer melt is cooled below its crystallization temperature and solidifies, retaining its shape. Traditionally, granules made via underwater pelletization are referred to as pellets. Low density polymers granulated via this technology typically are more spherical in shape while high density polymers are typically cylindrical in shape. Granules made via pastillation are referred to as pastilles. Since molten polymer is discharged onto a solid surface during pastillation, the pastille has a flat side with a rounded (hemispherical) top.

The term "solution polymerization," as used herein, refers to a polymerization process in which the formed polymer is dissolved in the polymerization solvent.

The term "polymer solution," as used herein, refers to the complete dissolution of polymer in one or more solvents (typically much lower in molecular weight than polymer) to form a homogeneous liquid. The solution comprises the polymer and solvent, and may also comprise unreacted monomers and other residuals of the polymerization reaction.

The term "solvent," as used herein, refers to a substance (for example, a hydrocarbon or a mixture of two or more hydrocarbons (excluding monomer and comonomer)) that dissolves a species of interest, like a monomer and/or polymer, resulting in a liquid phase.

The phrase "the rate of water spray," and similar terms used herein, refer to the amount of water sprayed in a specified time interval. This rate can be measured by collection water in a container of specified volume, and measuring the weight of the water per a specified time interval. It can also be estimated from using the associated pump curve for the water feed pump. It can also be measured using any of several mass and volumetric flow measurement technologies common in the industry. In one embodiment, or a combination of embodiments described herein, the phrase "the rate of water spray" and similar terms used herein refer to the amount of water sprayed in pounds per minute.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "olefin-based polymer" refers to a polymer that comprises 50 wt % or a majority amount of polymerized olefin (for example, ethylene or propylene), based on the weight of the polymer, and, optionally, may comprise at least one comonomer. The term "olefin-based polymer," or "olefin-based polymer in melt form," as used herein, refer to the polymer containing ≥99.0 wt %, preferably ≥99.5 wt %, more preferably ≥99.8 wt % of the olefin-based polymer, based on the weight of the olefin-based polymer.

The term "propylene-based polymer" refers to a polymer that comprises 50 wt % or a majority amount of polymerized propylene, based on the weight of the polymer, and, optionally, may comprise at least one comonomer.

The term "propylene-based interpolymer" refers to an interpolymer that comprises 50 wt % or a majority amount of polymerized propylene, based on the weight of the interpolymer, and comprises at least one comonomer (for example, ethylene or a C4 or higher α-olefin).

The term "propylene-based copolymer" refers to a copolymer that comprises 50 wt % or a majority amount of polymerized propylene, based on the weight of the copolymer, and a comonomer, as the only monomer types (for example, ethylene or a C4 or higher α-olefin).

The term "ethylene-based polymer" refers to a polymer that comprises a majority amount of polymerized ethylene, based on the weight of the polymer, and, optionally, may comprise at least one comonomer.

The term "ethylene-based interpolymer" refers to an interpolymer that comprises a majority amount of polymerized ethylene, based on the weight of the interpolymer, and comprises at least one comonomer.

The term "ethylene-based copolymer" refers to a copolymer that comprises a majority amount of polymerized ethylene, based on the weight of the interpolymer, and a comonomer, as the only monomer types.

The term "reactor configuration," refers to one or more reactors, and optionally one or more reactor pre-heaters, used to polymerize a polymer. Such reactors include, but are not limited to, tubular reactor(s), autoclave reactor(s), loop reactor(s), and continuously stirred tank reactor(s), and any combination.

The term "downstream," as used herein, in regard to a unit of operation, refers to a unit operation located after the current unit at issue. In regard to a direction of flow for a stream through the process, a stream flows from one unit operation to the next unit operation located downstream.

The term "upstream," as used herein, in regard to a unit of operation, refers to a unit operation located before the current unit at issue. In regard to a direction of flow for a stream through the process, a stream is processed in the reactor, for example, immediately before the first stage devolatilizer, and thus the reactor is upstream from the first stage devolatilizer.

The melting point ($T_m$) of the olefin based polymer, as used herein, refers to the highest intensity peak in a differential scanning calorimetry (DSC) profile, measured as described below.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Embodiments of the present disclosure include but are not limited to the following:

1. An apparatus to batch or continuously form solid polymer particles, the apparatus comprising the following components:
   A) at least one pastillation unit comprising a pastillation head, said unit used to form discrete molten polymer particles from a polymer melt;
   B) a moving belt to receive and transfer the discrete molten polymer particles from the pastillation head;
   C) a means to transfer water onto the moving belt, such that the water comes into contact with the discrete molten polymer particles on the moving belt to form the solid polymer particles; and wherein the water of component C is sprayed onto the discrete molten polymer particles, such that the ratio of "the rate of water spray" to "the discharge rate" is ≥3.0; and wherein the belt residence time is ≤50 seconds.

2. The apparatus of embodiment 1, wherein the specific capacity of the pastillation unit is ≥12 lbs/hr/ft².

3. The apparatus of embodiment 1 or embodiment 2, wherein "the rate of water spray" to "the discharge rate" is ≥4.0.

4. The apparatus of any one of the previous embodiments, wherein the belt residence time is ≤40 seconds.

5. The apparatus of any one of the previous embodiments, wherein the temperature of the polymer melt at the pastillation head is from 80° C. to 275° C.

6. The apparatus of any one of the previous embodiments, wherein a heat exchanger is located upstream from the pastillation unit.

7. The apparatus of any one of the previous embodiments, wherein two or more pastillation units are placed in parallel.

8. The apparatus of any one of the previous embodiments, wherein the polymer melt comprises an olefin-based polymer.

9. The apparatus of embodiment 8, wherein the polymer melt comprises ≥95 wt % of the olefin-based polymer, based on the weight of the polymer melt.

10. The apparatus of any one of embodiments 8-9, wherein the olefin-based polymer has a melt viscosity (177° C.) from 50 cP to 20,000 cP.

11. The apparatus of any one of embodiments 8-10, wherein the olefin based polymer has a number average molecular weight from 500 g/mole to 50,000 g/mole.

12. The apparatus of any one of embodiments 8-11, wherein the olefin based polymer has a density of 0.860 g/cc to 0.960 g/cc.

13. The apparatus of any one of embodiments 8-12, wherein the olefin-based polymer has a molecular weight distribution (MWD) from 1.8 to 4.0.

14. The apparatus of any one of embodiments 8-13, wherein the olefin-based polymer is a propylene-based polymer.

15. The apparatus of embodiment 14, wherein the propylene-based polymer is a propylene-based interpolymer, and further a propylene-based copolymer.

16. The apparatus of embodiment 14 or embodiment 15, wherein the propylene-based polymer is a propylene/alpha-olefin interpolymer.

17. The apparatus of embodiment 14 or embodiment 15, wherein the propylene-based polymer is a propylene/ethylene interpolymer.

18. The apparatus of any one of embodiments 1-13, wherein the olefin-based polymer is an ethylene-based polymer.

19. The apparatus of embodiment 18, wherein, the ethylene-based polymer is an ethylene-based interpolymer.

20. The apparatus of embodiment 18 or embodiment 19, wherein the ethylene-based polymer is an ethylene/alpha-olefin interpolymer.

21. A process to form solid polymer particles from a polymer melt, said process comprising pastillating the polymer melt using the apparatus of any one of the previous embodiments.

22. The process of embodiment 21, wherein the apparatus is combined with a centrifugal drier, a fluid bed drier, or a classifier.

Test Methods

Density

Density is measured in accordance with ASTM D-792. The result is reported in grams (g) per cubic centimeter, or g/cc.

Melt Index

For propylene-based polymers, the melt flow rate (MFR) is measured in accordance with ASTM-D 1238, Condition 230° C./2.16 kg, and is reported in grams eluted per 10 minutes. For ethylene-based polymers, the melt index ($I_2$) is measured in accordance with ASTM-D 1238, Condition 190° C./2.16 kg, and is reported in grams eluted per 10 minutes.

Melt Viscosity—Polymer at 177° C.

Melt viscosity is determined by ASTM D3236, which is incorporated herein by reference, using a Brookfield Laboratories DVII+ Viscometer equipped with disposable aluminum sample chambers. In general, a SC-31 spindle is used, suitable for measuring viscosities in the range of from 30 to 100,000 centipoise (cP). If the viscosity is outside this range, an alternate spindle should be used which is suitable for the viscosity of the polymer. A cutting blade is employed to cut samples into pieces small enough to fit into the 1 inch (25.4 mm) wide, 5 inches (127 mm) long samples chamber. The disposable tube is charged with 8-9 grams of polymer. The sample is placed in the chamber, which is in turn inserted into a Brookfield Thermosel and locked into place with bent needle-nose pliers. The sample chamber has a notch on the bottom that fits in the bottom of the Brookfield Thermosel to ensure that the chamber is not allowed to turn when the spindle is inserted and spinning. The sample is heated to the desired temperature (177° C./350° F.). The viscometer apparatus is lowered and the spindle submerged into the sample chamber. Lowering is continued until brackets on the viscometer align on the Thermosel. The viscometer is turned on, and set to a shear rate which leads to a torque reading in the range of 40 to 70 percent. Readings are taken every minute for about 15 minutes, or until the values stabilize, and then the final reading is recorded. The results are reported in centipoise (cP).

Calculated Melt Viscosity of Polymer at T

The viscosity measured at 177° C. using ASTM D3236, can be converted to a viscosity at the melt temperature at the droplet former by using the empirical relationship $$\eta = \eta_0 e^{-b(T-T_0)}, \text{ or } \ln(\eta) = \ln(\eta_0) - b(T-T_0),$$

where $\eta$ is the melt viscosity at the temperature T of the polymer at the droplet former, and no is the viscosity of the polymer at the reference temperature $T_0$ which is 177° C. The coefficient b indicates the temperature sensitivity of viscosity of the polymer, and its value is from 0.02 to 0.03° C.$^{-1}$ for olefin-based polymers (see Chris Rauwendaal, Polymer Extrusion, Chapter 6, Hanser Publishers, 1996). The b value can be determined by measuring viscosity of the polymer at different temperatures, and plotting the ln($\eta$) versus (T−$T_0$), and calculating its slope of the profile. For the olefin based polymers used in this work, the b coefficient was determined to be 0.026° C.$^{-1}$.

Differential Scanning Calorimetry (DSC)

Differential Scanning Calorimetry (DSC) is used to measure crystallinity in the polymers (e.g., ethylene-based (PE) polymer and propylene-based (PP) polymer). About 5 to 8 mg of polymer sample is weighed and placed in a DSC pan. The lid is crimped on the pan to ensure a closed atmosphere. The sample pan is placed in a DSC cell, and then heated, at a rate of approximately 10° C./min, to a temperature of 180°

C. for PE (230° C. for PP). The sample is kept at this temperature for three minutes. Then the sample is cooled at a rate of 10° C./min to −60° C. for PE (−40° C. for PP), and kept isothermally at that temperature for three minutes. The sample is next heated at a rate of 10° C./min, until complete melting (second heat). The percent crystallinity is calculated by dividing the heat of fusion (Hf), determined from the second heat curve, by a theoretical heat of fusion of 165 J/g for PP, and multiplying this quantity by 100 (for example, % cryst.=(Hf/165 J/g)×100 (for PP)). Unless otherwise stated, melting point(s) ($T_m$) of each polymer is determined from the second heat curve (peak $T_m$), and the crystallization temperature (Tc) is determined from the first cooling curve (peak Tc).

Gel Permeation Chromatography (GPC) for Molecular Weight

A high temperature gel permeation chromatography (GPC) system, equipped with Robotic Assistant Deliver (RAD) system is used for sample preparation and sample injection. The concentration detector is an Infra-red detector (IR-5) from Polymer Char Inc. (Valencia, Spain). Data collection is performed using a Polymer Char DM 100 Data acquisition box. The carrier solvent is 1,2,4-trichlorobenzene (TCB). The system is equipped with an on-line solvent degas device from Agilent. The column compartment is operated at 150° C. The columns are four, Mixed A LS 30 cm, 20 micron columns. The solvent is nitrogen-purged 1,2,4-trichlorobenzene (TCB) containing approximately 200 ppm 2,6-di-t-butyl-4-methyl-phenol (BHT). The flow rate is 1.0 mL/min, and the injection volume is 200 μl. A "2 mg/mL" sample concentration is prepared by dissolving the sample in "N2 purged" and preheated TCB (containing 200 ppm BHT), for 2.5 hours at 160° C., with gentle agitation.

The GPC column set is calibrated by running twenty narrow molecular weight distribution polystyrene standards. The molecular weight (MW) of the standards ranges from 580 g/mol to 8,400,000 g/mol, and the standards are contained in six "cocktail" mixtures.

Each standard mixture has at least a decade of separation between individual molecular weights. The equivalent polypropylene molecular weights of each PS standard are calculated by using following equation, with reported Mark-Houwink coefficients for polypropylene (Th. G. Scholte, N. L. J. Meijerink, H. M. Schoffeleers, & A. M. G. Brands, J. Appl. Polym. Sci., 29, 3763-3782 (1984)) and polystyrene (E. P. Otocka, R. J. Roe, N. Y. Hellman, & P. M. Muglia, Macromolecules, 4, 507 (1971)):

$$M_{PP} = \left(\frac{K_{PS} M_{PS}^{a_{PS}+1}}{K_{PP}}\right)^{\frac{1}{a_{PP}+1}}, \quad \text{(Eqn. 1)}$$

where Mpp is PP equivalent MW, MPS is PS equivalent MW, log K and a values of Mark-Houwink coefficients for PP and PS are listed below.

| Polymer | a | log K |
|---|---|---|
| Polypropylene | 0.725 | −3.721 |
| Polystyrene | 0.702 | −3.900 |

A logarithmic molecular weight calibration is generated using a fourth order polynomial fit, as a function of elution volume. Number average and weight average molecular weights are calculated according to the following equations:

$$M_n = \frac{\sum_{\square}^{i} wf_i}{\sum_{\square}^{i} (Wf_i / M_i)}, \quad \text{(Eqn. 2)}$$

$$M_W = \frac{\sum_{\square}^{i} (Wf_i * M_i)}{\sum_{\square}^{i} (Wf_i)}, \quad \text{(Eqn. 3)}$$

where $Wf_i$ and $M_i$ are the weight fraction and molecular weight of elution component i, respectively.

The mass detector constant, laser light scattering detector constant and viscometer detector constant are determined using a standard reference (reference polymer is a linear polyethylene homopolymer) with a known value of weight average molecular weight (Mw=120,000 g/mol; dn/dc=−0.104 mL/g; MWD=2.9) and intrinsic viscosity (1.873 dL/g). The chromatographic concentrations are assumed low enough to eliminate addressing second Virial coefficient effects (concentration effects on molecular weight).

Belt Residence Time: The belt residence time was calculated using the ratio of the cooling length of the belt (1.98 m) and the belt speed (cm/s) and multiplying by 100.

Specific Capacity: The specific capacity was calculated using the ratio of the feed rate or discharge rate and the cooling area of the belt. The cooling are of the belt which had a cooling length of 6.50 ft and cooling width of 0.23 ft was 1.50 ft$^2$.

EXPERIMENTAL

Materials

The materials used in this study are listed in Table 1.

TABLE 1

Materials

| Polymer | Type | Density g/cc | Viscosity cP @ 177° C. | Tm, ° C. | Tc, ° C. | % Cryst. |
|---|---|---|---|---|---|---|
| PE1 | Propylene/ethylene copolymer | 0.88 | 1000 | 99.8 | 65.6 | 28.8 |
| PE2 | Propylene/ethylene copolymer | 0.88 | 3000 | 99.2 | 64.1 | 27.0 |
| EO1 (AFFINITY GA 1875*) | Ethylene/octene copolymer | 0.87 | 6700 | 70.5 | 57.0 | 21.7 |

*Available from The Dow Chemical Company.

PE Polymerization

Polymerization Overview

The polymerization process is a solution polymerization process using one or more reactors, for example, loop reactors, isothermal reactors, plug flow reactors, and/or stirred tank reactors. Such reactors may be used in parallel, series, and/or any combination thereof, in continuous or batch mode to produce olefin based polymers (e.g., propylene-based polymers or ethylene-based polymers). See FIG. 1 for a schematic of a solution polymerization and isolation process.

A solution polymerization may occur in one or more well-stirred reactors, such as one or more loop reactors or one or more isothermal reactors, and at a temperature in the range from 100° C. to 300° C. (for example, from 120° C. to 190° C.), and at pressures in the range from 300 psig to 1,000 psig (for example, from 500 psig to 750 psig). The residence time in the solution polymerization process is typically in the range from 2 to 30 minutes (for example, from 5 to 20 minutes). One or more α-olefins (e.g., propylene or ethylene), solvent, hydrogen, one or more catalyst systems, and, optionally, one or more comonomers, are fed continuously to the reactor. Exemplary solvents include, but are not limited to, isoparaffins and naphthenics. For example, such solvents are commercially available under the name ISOPAR E® from ExxonMobil Chemical Co., Houston, Texas, or under the name SBP 100/140 from Shell Chemicals Europe. The reactant feed temperature is typically controlled from 5° C. to 50° C., by passing the feed through a heat exchanger system. Typically, the feed to the reactor is controlled at 10° C.

The catalyst components are injected into the polymerization reactor through, for example, an inlet injection device within the reactor, and are combined with the polymerizing reaction solution. The catalyst complex and cocatalyst components can also be combined, and fed to the reactor as a single stream, through the injection device. The catalyst complex is continuously injected into the reactor, to maintain the reactor monomer concentration at a specified target. The cocatalyst components are fed, based on calculated molar ratios relative to the catalyst complex.

The effluent from the polymerization reactor (containing solvent, monomer, comonomer, hydrogen, catalyst components, and molten polymer) is contacted with a catalyst deactivating agent (typically water) to stop the reaction. In addition, various additives, such as anti-oxidants, can be added at this point. The reactor effluent (containing solvent, monomer, comonomer, hydrogen, catalyst components, and molten polymer) then passes through a heat exchanger, to raise the stream temperature in preparation for separation of the polymer from the lower boiling reaction components. The stream then passes through a pressure let down control valve, which is used to maintain the pressure of the reactor at the specified target, and then passes into a multi-stage devolatilization system, where the polymer is removed from the solvent, hydrogen, and unreacted monomer and comonomer. Impurities are removed from the recycled, lower boiling reaction components, before entering the reactor again.

The volatile components, removed in the devolatilization step, may be recycled or incinerated. For example, most of the solvent is condensed, and recycled back to the reactor, after passing through purification beds. This recycled solvent may contain unreacted comonomer, and can be fortified with fresh comonomer, prior to reentry to the reactor. This recycle solvent may also contain hydrogen, and can be fortified with fresh hydrogen.

The pump at the outlet of the final devolatilizer can directly pump the low viscosity polymer melt to the pastillation system. There is also the option to first pump the low viscosity polymer melt from the final devolatilizer pump through a heat exchanger and then to the pastillation system. Finally, there is an option to first pump the low viscosity polymer melt from the final devolatilizer pump first to a booster pump that either pumps the polymer directly to the pastillation system or optionally through a heat exchanger and then the pastillation system. As the polymer flows through the heat exchanger, heat energy is added or removed from the polymer melt, prior to pastillation. For polymers with a product viscosity less than, or equal to, 3000 cP at 177° C. (ASTM D3236), the heat exchanger is used to cool the polymer melt, and for polymers with a product viscosity greater than 3000 cP at 177° C., the heat exchanger is used to heat the polymer melt. To prevent plugging of the melt heat exchanger and/or the pastillation system, the minimum polymer melt temperature during the pastillation step is "Tm+20° C.", where "Tm" is the melting point temperature of the polymer product (as determined by DSC). To prevent polymer degradation, the maximum temperature is typically limited to 300° C.

The polymer melt enters the pastillation system through a droplet former (see FIG. 1). Here, the "droplet former" consists of a stationary feed bar, enveloped by a rotating cylindrical steel shell, equipped with holes on its circumference. Molten polymer from the feed bar section of the droplet former flows radially through the rotating shell, before discharging from the holes in the steel shell, and onto a steel conveying belt. Substantially uniform polymer droplets, or pastilles, deposit onto the conveying belt. For a given throughput, the pastille diameter can be varied by manipulating the number of holes on the shell of the droplet former and/or the diameter of the holes, and a typical pastille diameter is from 1 mm to 4 mm. The droplet former rotates counterclockwise, in the opposite direction of the moving belt. A copious amount of chilled water is sprayed directly onto the underside of the belt. As the belt temperature drops it conductively cools the molten pastilles removing the requisite heat from the pastilles before they discharge from the belt. As the pastilles discharge from the belt they are air conveyed (at ambient temperature) to a storage hopper. The water is collected, chilled and recycled back to the spray nozzles used to discharge the water onto the underside of the belt. The chilled water can be at temperature from 1° C. to 40° C., with a preferred temperature from 1° C. to 5° C.

The polymer pastilles typically have less than 1,500 $ppm_w$ (parts per million per weight basis), further less than 1,000 $ppm_w$, further less than 500 $ppm_w$, of volatile impurities, measured immediately after pastillation. The polymer products typically have a viscosity less than 30000 cP (177° C.); for example, in the range from 1000 to 10000 cP (177° C.), when measured according to ASTM D3236.

Actual Polymerizations and Pastillations

Production of the samples described below was executed using a loop reactor comprising a positive displacement pump that continuously circulated the reaction liquor through two shell and tube heat exchangers. SYLTHERM 800 flowed across the shell side of the heat exchangers, to remove some of the reaction heat, and keep the reaction liquor at the target temperature, 155° C. Since the reactor operated hydraulically full, the reactor effluent was equal to the sum of the individually controlled component feed flows described below. Production of these samples was completed at a reaction pressure equal to 550 psig, to ensure the reaction liquor was a single, liquid phase.

ISOPAR E (solvent) and propylene (monomer) were each individually pumped to the reactor. The ISOPAR E flow was manipulated to maintain a solvent to monomer ratio equal to 2.3. The ethylene (comonomer) feed was pressurized using a compressor, and the flow was manipulated to maintain a monomer to comonomer ratio equal to 15. The flow of high purity hydrogen (from high pressure gas cylinders) was metered into the ethylene stream at a rate sufficient to keep the polymer viscosity at the 1,000 cP target. For the reaction conditions used to produce the polymer PE-1, the feed rate was 28.0 grams per hour. The hydrogen feed rate to produce PE-2 was 19.9 grams/hr. All three feeds were mixed and subsequently passed through a heat exchanger system to control the stream temperature at 10° C. This cold feed stream was injected into the polymerization reactor operating at 155° C. and 550 psig.

The catalyst package was a three component system. The hafnium, [[rel-2',2'''-[(1R,2R)-1,2-cyclohexanediylbis(methyleneoxy-.kappa.O)]bis[3-(9H-carbazol-9-yl)-5-methyl[1,1'-biphenyl]-2-olato-.kappa.O]](2-)]dimethyl-catalyst complex was used to produce the copolymer samples. The cocatalyst activator was bis(hydrogenated tallow alkyl)methyl-ammonium, tetrakis(pentafluorophenyl) borate. The aluminum scavenger consisted of aluminoxanes, iso-Bu Me, branched, cyclic and linear; modified methyl aluminoxane.

The catalyst flow was manipulated to control the propylene conversion at 91 wt %. The ethylene conversion was dictated by the reaction conditions and the catalyst kinetics, and it was not directly controlled. The flow of ethylene was manipulated to keep the polymer density at the 0.8830 g/cc target. The bulk melting temperature for the polymer (Tm) was 103° C. The cocatalyst activator flow was manipulated (based on the catalyst flow) to maintain a molar ratio of cocatalyst to catalyst metal at 2.4. The aluminum scavenger flow was manipulated (based on the catalyst flow) to maintain a molar ratio of aluminum to catalyst metal equal to a value in the range between 30 and 50. Each of the three components in the catalyst package was separately pumped directly to the reactor using positive displacement pump technology.

Upon exiting the reactor, the polymer was contacted with stoichiometric amounts of deionized water (to catalyst components) to terminate the polymerization. Subsequently the polymer solution passed through a heat exchanger to increase the stream temperature to 255° C., as preparation to remove the solvent and unreacted monomers from the polymer. After heating, the stream passed through a pressure let down valve, and into a devolatilizer vessel operating at 200° C. and 12 psig. The polymer stream cooled to approximately 200° C., as a result of the evaporation of the light components. The polymer rich melt was pumped from the bottom of the vessel using a gear pump, while the vaporized components exited the top of the vessel. The polymer rich phase was pumped through another heat exchanger to heat the stream to 225° C., for the second and final devolatilization. The hot stream entered the second devolatilizer vessel operating at a 200° C. and 20 mmHg-absolute. The polymer melt with less than 2,000 ppm$_w$ volatile components was pumped from the bottom of the vessel using a gear pump, while the vaporized components exited the top of the vessel.

The polymer melt was pumped from the second stage gear pump to a booster pump. The booster pump generated the pressure required to push the polymer through a downstream heat exchanger and pastillator system. The polymer melt temperature was controlled at approximately 140° C. to properly pastillate the polymer without fiber formation. The droplet former rotated counterclockwise, at a speed of between 28 and 40 feet per minute, while the conveying belt rotated clockwise at an intentionally equivalent speed, 28 to 40 feet per minute. Water, at a flow rate equal to 6,000 lbs/hr and a temperature within a range equal to 5 and 10° C., was sprayed on the underside of the belt to cool and solidify the pastilles, before they disengaged from the belt, and into an air conveying system for transfer to a hopper.

TABLE 2

Polymerization Conditions and Polymer Properties

|  | Units | PE-1 | PE-2 |
| --- | --- | --- | --- |
| Feed Temperature | ° C. | 10 | 10 |
| Reactor Temp | ° C. | 155 | 155 |
| Reactor Pressure | psig | 550 | 550 |
| Propylene Feed | lbs/hr | 188 | 199 |
| Ethylene Feed | lbs/hr | 12.6 | 13.2 |
| Hydrogen Feed | grams/hr | 28.0 | 19.9 |
| ISOPAR E Feed | lbs/hr | 381 | 404 |
| Catalyst Metal Feed | mg Hf/hr | 83 | 152 |
| Cocatalyst Activator* Molar Ratio | moles cocat/mole Hf | 2.4 | 2.4 |
| Aluminum Molar Ratio | moles Al/mole Hf | 31 | 47 |
| Propylene Conversion | wt % [(reactor feed propylene-reactor exit propylene)]/(reactor feed propylene) | 91.1 | 91.2 |
| Ethylene Conversion | wt % [(reactor feed ethylene-reactor exit ethylene)]/(reactor feed ethylene) | 92.9 | 93.1 |
| Polymer Density (ASTM D-792) | g/cc | 0.8832 | 0.8831 |
| Polymer Viscosity (ASTM D-3236) | cP @ 177° C. | 1,044 | 2,904 |

*Cocatalystactivator = bis(hydrogenated tallow alkyl)methyl-ammonium, tetrakis(pentafluorophenyl)-borate

Apparatus

A modular pastillation line manufactured by Kaiser Process & Belt Technology GmbH was used. It consisted of an agitated melting kettle (40 liters), with an adjustable speed gear pump, a pastillation head and a cooling belt. The pastillation head had 405 nozzles (15 per row×27 rows), each with a "1.5 mm" diameter, and configured in a staggered arrangement having a pitch of 8 mm. The nozzles are also referred to as holes. The pastillator head was oil heated. The cooling belt had a total width of 100 mm, an effective cooling width of 70 mm, and a cooling belt length of 1.98 m. Cooling water could be sprayed from underneath the belt, at a pre-determined rate. The water temperature was maintained at 7° C. for all experiments.

The above set-up was further modified so that water could be sprayed from over the belt to more efficiently cool the pastilles. A total of seven spray nozzles were installed, equidistant over the belt, and the nozzle tips were arranged to cover the entire width of the belt. This set-up included a drain pan below the pastillator belt to collect the water that was sprayed. Further, some runs were performed by completely removing the cooling belt, and replacing it with a water bath.

Experiments

Experiments 1-1 through 1-4, in Table 3, were executed using conventional pastillation (water sprayed from underneath the belt). As the rate and belt speed were increased, the discharge temperature increased. At a discharge rate of about "15 lbs/hr," the discharge temperature exceeded 40° C., and the pastilles were tacky and clustered. For PE-1, the pastille discharge temperature had to be below 35° C., to avoid agglomeration. Further increase in discharge rate and belt speed increased the discharge temperature even higher, resulting in agglomeration. A residence time, greater than 40 seconds, was required, to completely cool the pastilles and prevent agglomeration (i.e. clustering) as they discharge from the conveying belt. The ratio of rate of water spray over belt to the feed rate was zero, in these comparative cases. Above a specific capacity of 13.9 lbs/hr/ft$^2$ good pastilles could not be obtained.

TABLE 3

Conventional Pastillation with 1000 cP, 0.88D, PE copolymer (PE-1)

| Material | 1-1 Comparative 1000 cP, 0.88D, PE | 1-2 Comparative 1000 cP, 0.88D, PE | 1-3 Comparative 1000 cP, 0.88D, PE | 1-4 Comparative 1000 cP, 0.88D, PE |
|---|---|---|---|---|
| Kettle Temperature side, ° C. | 160 | 160 | 160 | 160 |
| Kettle Temperature bottom, ° C. | 160 | 163 | 162 | 162 |
| Cooling Water Under belt | Yes | Yes | Yes | Yes |
| Cooling Water Spray Overbelt | No | No | No | No |
| Rate of Water Spray Under Belt, lbs/min | 24 | 24 | 24 | 24 |
| Rate of Water Spray Over belt, lbs/min | — | — | — | — |
| Outer Shell Speed, rpm | 12 | 15 | 15 | 20 |
| Belt Speed, cm/s | 3.6 | 5.1 | 5.1 | 6.7 |
| Discharge rate, lbs/hr | 13.9 | 17.9 | 22.9 | 27.9 |
| Measured Product Temp Tank, ° C. | 155 | 155 | 156 | 156 |
| Calculated Viscosity at Product Temperature, cP | 1772 | 1772 | 1726 | 1726 |
| Belt Residence Time, s | 55 | 39 | 39 | 30 |
| Measured Pastille Temperature at Exit, ° C. | 23 | 38 | 42 | 52 |
| Rate of Water Spray Over Belt/Discharge Rate | 0 | 0 | 0 | 0 |
| Pastille Observation | Good | Slightly tacky | Agglomerating | Lump at End |
| Specific Capacity, lbs/hr/ft$^2$ | 9.28 | 11.92 | 15.22 | 18.58 |
| Measured Pastille Dimension, Diameter, mm × Thickness, mm | 5.0 × 2.6 | 5.4 × 2.7 | 5.8 × 2.8 | 6.2 × 2.8 |

In Experiments 1-5 through 1-9, in Table 4, in addition to water being sprayed from underneath the belt, it was also sprayed from above the belt. The pastille temperature, even at 40 lbs/hr, was below 20° C., and pastilles did not agglomerate. Further rate increases were not possible because the gear pump was operating at maximum capacity. Good pastilles could be obtained at a conveying belt residence time equal to 20 seconds (Experiment 1-9). The ratio of rate of water spray from above the belt to the feed rate was 9.7 to 21.5 in these cases. A specific capacity of >15 lbs/hr/ft$^2$ was possible.

TABLE 4

Water Spray Both Over and Under the belt with 1000 cP, 0.88D, PE copolymer (PE-1)

| Material | 1-5 Inventive 1000 cP, 0.88D, PE | 1-6 Inventive 1000 cP, 0.88D, PE | 1-7 Inventive 1000 cP, 0.88D, PE | 1-8 Inventive 1000 cP, 0.88D, PE | 1-9 Inventive 1000 cP, 0.88D, PE |
|---|---|---|---|---|---|
| Kettle Temperature side, ° C. | 159 | 159 | 160 | 161 | 161 |
| Kettle Temperature bottom, ° C. | 160 | 160 | 163 | 162 | 161 |
| Cooling Water Under belt | Yes | Yes | Yes | Yes | Yes |
| Cooling Water Spray Overbelt | Yes | Yes | Yes | Yes | Yes |
| Rate of Water Spray Under Belt, lbs/min | 23.9 | 23.9 | 23.9 | 23.9 | 23.9 |
| Rate of Water Spray Over belt, lbs/min | 6.75 | 6.75 | 6.75 | 6.75 | 6.75 |
| Outer Shell Speed, rpm | 15 | 15 | 20 | 25 | 30 |
| Belt Speed, cm/s | 5.1 | 5.1 | 6.7 | 8.1 | 9.7 |

TABLE 4-continued

Water Spray Both Over and Under the belt with 1000 cP, 0.88D, PE copolymer (PE-1)

| | Experiment # | | | | |
|---|---|---|---|---|---|
| | 1-5 Inventive 1000 cP, 0.88D, PE | 1-6 Inventive 1000 cP, 0.88D, PE | 1-7 Inventive 1000 cP, 0.88D, PE | 1-8 Inventive 1000 cP, 0.88D, PE | 1-9 Inventive 1000 cP, 0.88D, PE |
| Material | | | | | |
| Discharge Rate, lbs/hr | 18.8 | 23.0 | 29.5 | 35.4 | 41.6 |
| Measured Product Temp Tank, ° C. | 155 | 154 | 155 | 154 | 151 |
| Calculated Viscosity at Product Temperature, cP | 1,772 | 1,818 | 1,772 | 1,818 | 1,966 |
| Belt Residence Time, s | 39 | 39 | 30 | 24 | 20 |
| Measured Pastille Temperature at Exit, ° C. | 11 | 11 | 15 | 17 | 19 |
| Rate of Water Spray Over Belt/Discharge Rate | 21.5 | 17.6 | 13.7 | 11.4 | 9.7 |
| Pastille Observation | Good | Good | Good | Good | Good |
| Specific Capacity, lbs/hr/ft$^2$ | 12.54 | 15.31 | 19.62 | 23.58 | 27.72 |
| Measured Pastille Dimension, Diameter, mm × Thickness, mm | 5.7 × 2.5 | 6.7 × 2.5 | 6.0 × 2.2 | 7.0 × 2.3 | 6.8 × 2.5 |

Representative Calculations

1) Calculated Viscosity at Product Temperature, cP—for a comparative example. For e.g. in Comparative Example 1-1 the material viscosity at 177 C ($T_0$) is 1000 cP ($\eta_0$). The measured product tank temp. (T) was 155 C. The temperature sensitivity of viscosity (b) was 0.026° C.$^{-1}$. The calculated viscosity at Product Temperature (11) is then estimated using the formula, $\eta=\eta_0 e^{-b(T-T_0)}$ as 1772 cP.

2) Calculated Viscosity at Product Temperature, cP—for an inventive example. For e.g. in Inventive Example 1-6 the material viscosity at 177 C ($T_0$) is 1000 cP ($\eta_0$). The measured product tank temp. (T) was 154 C. The temperature sensitivity of viscosity (b) was 0.026° C.$^{-1}$. The calculated viscosity at Product Temperature (11) is then estimated using the formula, $\eta=\eta_0 e^{-b(T-T_0)}$ as 1818 cP.

3) Belt Residence Time, s—for a comparative example. For e.g. in Comparative Example 1-1, the belt residence time was calculated as 55 s, using the ratio of the cooling length of the belt (1.98 m, length of belt receiving the water spray) to the belt speed (3.6 cm/s) and multiplying by 100.

4) Belt Residence Time, s—for an inventive example. For e.g. in Inventive Example 1-6, the belt residence time was calculated as 39 s using the ratio of the cooling length of the belt (1.98 m) to the belt speed (5.1 cm/s) and multiplying by 100.

5) Specific Capacity of the pastillation unit, lbs/hr/ft$^2$—for an comparative example For e.g. in Comparative Example 1-1, the specific capacity was calculated by dividing the discharge rate (13.9 lbs/hr) by the cooling area of belt (1.50 ft$^2$) as 9.28 lbs/hr/ft$^2$.

6) Specific Capacity of the pastillation unit, lbs/hr/ft$^2$—for an inventive example For e.g. in Inventive Example 1-6, the specific capacity was calculated by dividing the discharge rate (23 lbs/hr) by the cooling area of belt (1.50 ft$^2$) as 15.31 lbs/hr/ft$^2$.

7) The rates of water spray for the examples are measured as lbs/min.

8) The discharge rates for the examples are measured as lbs/hr.

In Experiments, 1-10 through 1-13 in Table 5, the discharge rates were again increased to "45 lbs/hr," but all water cooling was applied via spraying from above the belt (cooling water from underneath the belt was shut off). For these experiments pastilles did not agglomerate but gear pump capacity limitations prohibited a further rate. Good pastilles could be obtained at a conveying belt residence time as low as 15 seconds (Experiment 1-13). The ratio of rate of water spray from above the belt to the feed rate was 9.7 to 21.5 in these cases. A specific capacity of >15 lbs/hr/ft$^2$ was possible.

Another important observation was that the water, sprayed from above the belt, was only at 5-7 lbs/min, whereas the water, from underneath the belt (as in conventional pastillation), was 24 lbs/min. This further demonstrates the heat transfer efficiency improvement through directly spraying water onto the pastilles. Experiments 2-1 through 2-4 in Table 6 were performed with PE-2. PE-2 pastillated similar to PE-1, described in the earlier section. A higher pastillation temperature of 185° C. (versus 155° C. with PE-1) was used to avoid stringing (fiber formation). Experiments 2-3 and 2-4, in Table 6, show that when spraying the water from above the belt pastillation rates of above 40 lbs/hr were possible, and good pastille quality was obtained. The ratio of rate of water spray from above the belt to the feed rate was 12.9 to 28.5 in these cases. A specific capacity of >15 lbs/hr/ft$^2$ was possible.

Table 7 shows experiments 3-1 through 3-4 performed with a commercial ethylene octene copolymer (AFFINITY GA1875, EO1). An operating temperature of 210° C. was used due to the relatively high viscosity. Good pastilles could be formed at rates greater than 40 lbs/hr using hybrid pastillation. Good pastilles could be obtained at a conveying belt residence time as low as 15 seconds. The ratio of rate of water spray from above the belt to the feed rate was 12.9 to 28.5 in these cases. A specific capacity of >15 lbs/hr/ft$^2$ was possible. Table 8 compares results of this inventive process to the comparative process.

TABLE 5

Water Spray Over the belt with 1000 cP, 0 88D, PE copolymer (PE-1)

| | Experiment # | | | |
|---|---|---|---|---|
| Material | 1-10 Inventive 1000 cP, 0.88D, PE | 1-11 Inventive 1000 cP, 0.88D, PE | 1-12 Inventive 1000 cP, 0.88D, PE | 1-13 Inventive 1000 cP, 0.88D, PE |
| Kettle Temperature side, ° C. | 161 | 169 | 161 | 161 |
| Kettle Temperature bottom, ° C. | 161 | 162 | 160 | 162 |
| Cooling Water Under belt | No | No | No | No |
| Cooling Water Spray Overbelt | Yes | Yes | Yes | Yes |
| Rate of Water Spray Under Belt, lbs/min | — | — | — | — |
| Rate of Water Spray Over belt, lbs/min | 6.75 | 5.25 | 5.25 | 5.25 |
| Outer Shell Speed, rpm | 30 | 30 | 33 | 37 |
| Belt Speed, cm/s | 9.7 | 9.7 | 11.3 | 13.5 |
| Feed rate or Discharge rate, lbs/hr | 41.2 | 45.2 | 45.4 | 44.3 |
| Measured Product Temp Tank, ° C. | 151 | 156 | 156 | 156 |
| Calculated Viscosity at Product Temperature, cP | 1966 | 1726 | 1726 | 1726 |
| Belt Residence Time, s | 20 | 20 | 18 | 15 |
| Measured Pastille Temperature at Exit, ° C. | 20 | 20 | 21 | 23 |
| Rate of Water Spray Over Belt/Discharge Rate | 9.8 | 7.0 | 6.9 | 7.1 |
| Pastille Observation | Good | Good | Good | Good |
| Specific Capacity, lbs/hr/ft$^2$ | 27.45 | 30.09 | 30.22 | 29.48 |
| Measured Pastille Dimension, Diameter, mm × Thickness, mm | — | 6.6 × 2.2 | 5.9 × 2.3 | 6.3 × 2.4 |

TABLE 6

Water Spray Over the belt with 2800 cP, 0.88D, PE copolymer (PE-2)

| | Experiment # | | | |
|---|---|---|---|---|
| Material | 2-1 Inventive 2800 cP, 0.88D, PE | 2-2 Inventive 2800 cP, 0.88D, PE | 2-3 Inventive 2800 cP, 0.88D, PE | 2-4 Inventive 2800 cP, 0.88D, PE |
| Kettle Temperature side, ° C. | 184 | 184 | 185 | 185 |
| Kettle Temperature bottom, ° C. | 186 | 186 | 187 | 185 |
| Cooling Water Under belt | No | No | No | No |
| Cooling Water Spray Overbelt | Yes | Yes | Yes | Yes |
| Rate of Water Spray Under Belt, lbs/min | — | — | — | — |
| Rate of Water Spray Over belt, lbs/min | 9.1 | 9.1 | 9.1 | 9.1 |
| Outer Shell Speed, rpm | 15 | 20 | 37 | 30 |
| Belt Speed, cm/s | 5.8 | 7.3 | 14.2 | 10.6 |
| Feed Rate or Discharge Rate, lbs/hr | 19.2 | 28.3 | 43.4 | 42.3 |
| Measured Product Temp Tank, ° C. | 178 | 177 | 177 | 177 |
| Calculated Viscosity at Product Temperature, cP | 2728 | 2800 | 2800 | 2800 |
| Belt Residence Time, s | 34 | 27 | 14 | 19 |
| Measured Pastille Temperature at Exit, ° C. | 12 | 14 | 27 | 23 |
| Rate of Water Spray Over Belt/Discharge rate | 28.5 | 19.3 | 12.6 | 12.9 |
| Pastille Observation | Good | Good | Good | Good |
| Specific Capacity, lbs/hr/ft$^2$ | 12.76 | 18.83 | 28.90 | 28.16 |
| Measured Pastille Dimension, Diameter, mm × Thickness, mm | 4.8 × 2.5 | 6.2 × 2.6 | 6.3 × 2.4 | 6.6 × 2.4 |

TABLE 7

Water Spray Over the belt with 6700 cP, 0.87D, EO copolymer (EO1)

| | Experiment # | | | |
|---|---|---|---|---|
| Material | 3-1 Inventive 6700 cP, 0.87D, EO | 3-2 Inventive 6700 cP, 0.87D, EO | 3-3 Inventive 6700 cP, 0.87D, EO | 3-4 Inventive 6700 cP, 0.87D, EO |
| Kettle Temperature side, ° C. | 230 | 229 | 230 | 230 |
| Kettle Temperature bottom, ° C. | 230 | 231 | 230 | 230 |
| Cooling Water Under belt | No | No | No | No |

TABLE 7-continued

Water Spray Over the belt with 6700 cP, 0.87D, EO copolymer (EO1)

| Material | Experiment # | | | |
|---|---|---|---|---|
| | 3-1 Inventive 6700 cP, 0.87D, EO | 3-2 Inventive 6700 cP, 0.87D, EO | 3-3 Inventive 6700 cP, 0.87D, EO | 3-4 Inventive 6700 cP, 0.87D, EO |
| Cooling Water Spray Overbelt | Yes | Yes | Yes | Yes |
| Rate of Water Spray Under Belt, lbs/min | — | — | — | — |
| Rate of Water Spray Over belt, lbs/min | 8.8 | 8.8 | 8.8 | 8.8 |
| Outer Shell Speed, rpm | 15 | 20 | 28 | 30 |
| Belt Speed, cm/s | 6.5 | 7.3 | 13.1 | 10.6 |
| Feed rate or Discharge Rate, lbs/hr | 20.0 | 27.9 | 34.0 | 34.7 |
| Measured Product Temp Tank, ° C. | 208 | 208 | 210 | 211 |
| Calculated Viscosity at Product Temperature, cP | 2992 | 2992 | 2841 | 2768 |
| Belt Residence Time, s | 30 | 27 | 15 | 19 |
| Measured Pastille Temperature at Exit, ° C. | 12 | 14 | 19 | 17 |
| Rate of Water Spray Over Belt/Discharge rate | 26.5 | 18.9 | 15.5 | 15.2 |
| Pastille Observation | Good | Good | Good | Good |
| Specific Capacity, lbs/hr/ft$^2$ | 13.29 | 18.57 | 22.66 | 23.10 |
| Measured Pastille Dimension, Diameter, mm × Thickness, mm | 5.2 × 2.5 | 5.4 × 2.6 | 5.1 × .4 | 5.1 × 2.4 |

TABLE 8

Water Spray on Belt V/S water bath underneath the pastillator

| Material | Experiment # | |
|---|---|---|
| | 4-1 Inventive 1000 cP, 0.88D, PE-1 | 4-2 Comparative 1000 cP, 0.88D, PE-1 |
| Kettle Temperature side, ° C. | 159 | 159 |
| Kettle Temperature bottom, ° C. | 160 | 160 |
| Measured Product Temp Tank, ° C. | 155 | 154 |
| Equipment Configuration | Same as Expt. 1-5, Pastillator + Water bath under pastillator belt + Water spray over belt | Water bath under pastillator |
| Calculated Viscosity at Product Temperature, cP | 1772 | 1818 |
| Observations | Good pastilles are formed | Material Agglomerates & pastilles are not formed |

It was demonstrated that by direct spraying water onto the pastilles, cooling efficiencies were significantly improved facilitating pastillation rate increases more than 2.5 times that of conventional pastillation. Experiments at a higher feed rate or discharge rate were not possible due to the gear pump capacity limitations. It may be possible to pastillate olefin-based polymers with a residence time as low as 8 seconds residence for fast crystallizing materials.

The direct spraying of water from above the belt experiments were successfully used for three materials: 1,000 cP and 3,000 cP, 0.88 D, propylene-ethylene copolymers and AFFINITY™ GA 1875 (6,700 cP, 0.87 D, ethylene-octene copolymer).

The pastillation experiments also demonstrated that water spraying from below the belt is not necessary. Direct water spraying from above the belt is the most efficient way to cool the pastilles. This finding could significantly simplify the cooling belt design. A suitable ratio of rate of water spray over belt to feed rate (or discharge rate) is >3. Below this ratio range the cooling is less efficient. Although the inventive process will work for this ratio being above 40, the cooling water usage is in excess of what is required. A further benefit observed was that spraying water from above the belt requires significantly less cooling water as compared to the conventional pastillation process where the water is spray from underneath the belt.

What is claimed is:

1. A process to form solid polymer particles from a polymer melt, said process comprising pastillating the polymer melt using an apparatus to batch or continuously form solid polymer particles, the apparatus comprising the following components:
   A) at least one pastillation unit comprising a pastillation head, said unit used to form discrete molten polymer particles from a polymer melt comprising ≥95 wt % of an olefin-based with a melt viscosity (177° C.) from 50 cP to 20,000 cP;
   B) a moving belt to receive and transfer the discrete molten polymer particles from the pastillation head;
   C) a means to transfer water over the moving belt, such that the water comes into contact with the discrete molten polymer particles on the moving belt at a rate of water spray to form the solid polymer particles at a discharge rate with a belt residence time of ≤50 seconds; and wherein the water of component C is sprayed onto the discrete molten polymer particles, such that the ratio of the rate of water spray to the discharge rate is ≥3.0.

2. The process of claim 1, wherein the specific capacity of the pastillation unit of ≥12 lbs/hr/ft$^2$.

3. The process of claim 1, wherein the temperature of the polymer melt at the pastillation head is from 80° C. to 275° C.

4. The process of claim 1, wherein the olefin based polymer has a number average molecular weight from 500 g/mole to 50,000 g/mole.

5. The process of claim 1, wherein the olefin based polymer has a density of 0.860 g/cc to 0.960 g/cc.

6. The process of claim 1, wherein the olefin-based polymer has a molecular weight distribution (MWD) from 1.8 to 4.0.

7. The process of claim 1, wherein the olefin-based polymer is a propylene-based polymer.

8. The process of claim 7, wherein the propylene-based polymer is a propylene/alpha-olefin interpolymer.

9. The process of claim 7, wherein the propylene-based polymer is a propylene/ethylene interpolymer.

10. The process of claim 1, wherein the olefin-based polymer is an ethylene-based polymer.

11. The process of claim 10, wherein the ethylene-based polymer is an ethylene/alpha-olefin interpolymer.

* * * * *